United States Patent [19]

Juhl

[11] 4,337,003
[45] Jun. 29, 1982

[54] LOCKABLE OR FREE-WHEELING DEVICE INSERTABLE BETWEEN A DRIVEN VEHICLE-WHEEL AND ITS AXLE CONNECTOR

[76] Inventor: Barker J. Juhl, 16 Cottage Grove, Springfield, Ill. 62707

[21] Appl. No.: 125,520

[22] Filed: Feb. 28, 1980

[51] Int. Cl.³ .............................................. B60B 27/02
[52] U.S. Cl. ......................................... 403/1; 192/50; 301/128
[58] Field of Search ............... 403/1; 301/128; 192/50

[56] References Cited
U.S. PATENT DOCUMENTS

| | | | |
|---|---|---|---|
| 1,904,081 | 4/1933 | Pratt | 301/38 |
| 3,552,813 | 11/1971 | Bresca, Jr. et al. | 301/128 UX |
| 4,089,610 | 5/1978 | Kleespies | 403/1 |

Primary Examiner—Andrew V. Kundrat
Attorney, Agent, or Firm—Ralph F. Staubly

[57] ABSTRACT

A device provides free-wheeling four-wheel towing of an automotive vehicle without damage to its (especially automatic) transmission. It is easily insertable co-axially between the power-driven wheel-mounting structure and the removed and replaced wheel. It comprises a base plate, a shaft on the base plate, a hub rotatable around the shaft, and a second wheel-mounting plate fixed to the hub by short lug-screws. The free-wheeling can be locked-out by substituting long lug-screws for half of the short ones. The long lug-screws enter threaded bores in posts fixed to the base plate to lockout the free-wheeling, and they are slightly thinner then the short lug-screws to facilitate their placement.

6 Claims, 4 Drawing Figures

LOCKABLE OR FREE-WHEELING DEVICE INSERTABLE BETWEEN A DRIVEN VEHICLE-WHEEL AND ITS AXLE CONNECTOR

BACKGROUND AND OBJECTS OF THE INVENTION

It is known to design the permanent connection between a vehicle wheel and its driving axle so that the wheel can normally be drivingly coupled to the axle but can be disengaged therefrom for free-wheeling towing of the vehicle (e.g. U.S. Pat. No. 3,282,365 to McReynolds and several of the patents cited therein). But it is not known to provide an easily and quickly attachable and detachable device that is insertable between a driven vehicle-wheel and its axle connector for rendering the assemblage free-wheeling to protect the transmission mechanism (especially the automatic type) against damage.

It is the principal object of this invention to provide such a device. It is a further object to construct the device for easy free-wheeling-lockout so that the towed vehicle optionally can be driven without dismounting the assemblage. Other objects and advantages will appear as the following detailed description proceeds.

BRIEF DESCRIPTION OF THE DRAWING FIGURES

DETAILED DESCRIPTION

Figure 1:
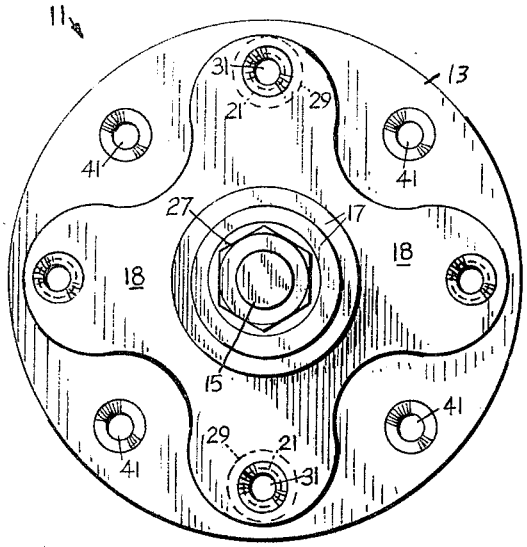
FIG. 1 is a front elevational view of a preferred embodiment of the invention.
Figure 2:
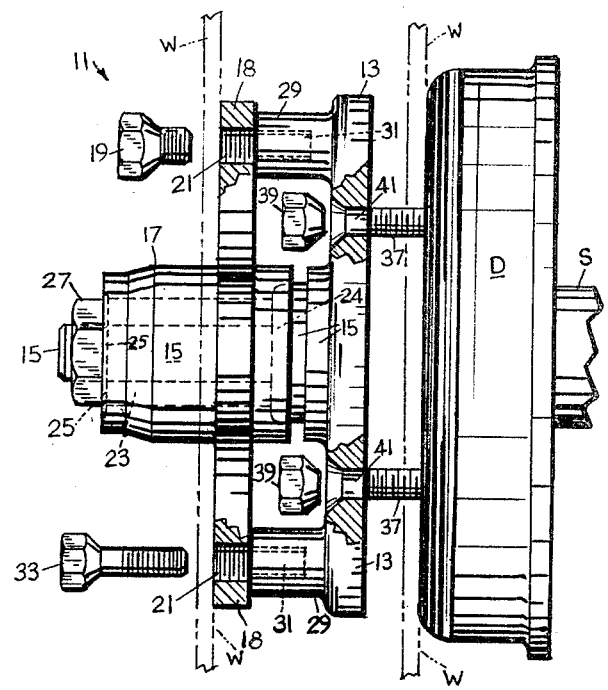
FIG. 2 is an axially exploded side elevational view of the device of FIG. 1.
Figure 3:
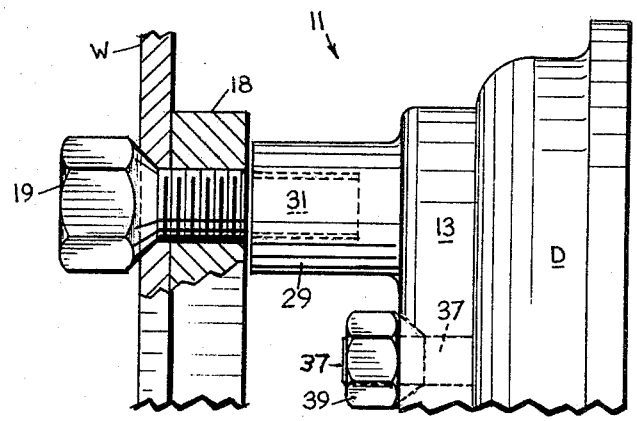
FIG. 3 is an enlarged fragmentary elevational view of the upper third of FIG. 2, with parts assembled.

With reference now to FIGS. 1 and 2 of the drawings, the numeral 11 generally designates a preferred embodiment of the invention, shown herein in combination with a wheel-mounting drum D and the central portion of a disk-type wheel W. The device 11 comprises basically: a rigid base plate 13; a shaft 15 firmly fixed to the center of the base plate 13 to be coaxially aligned with the vehicle drive-shaft S; a hub 17 surrounding and rotatable on the shaft 15; a wheel-supporting plate-like member 18 fixed to the hub 17; and a plurality of lug-screws 19 for re-mounting the removed wheel W on the plate-like member 18 by passing through conventional apertures in the wheel W and into threaded bores 21 in the plate-like member 18, which bores are spaced to align with the wheel apertures so as to re-mount the wheel W co-axially with the shafts S and 15.

As shown in FIG. 1, the plate-like member 18 desirably has a clover-leaf shape to provide space between its blades to facilitate access by a lug-wrench to the heads of the lug-nuts 39. But alternatively the member 18 could be circular and be provided with large openings (instead of the interblade gaps) for access to the lug-nuts. The wheel W in FIG. 2 is shown in phantom in its original position (right) and in its free-wheeling position (left).

The bearing between the shaft 15 and the hub 17 in the space 23 (FIG. 2) preferably comprises a pair of tapered roller bearings (not shown) of known construction. They are retained in place by a shaft abutment 24, and by a washer 25 and a nut 27 on the threaded end of the shaft 15.

Figure 4:
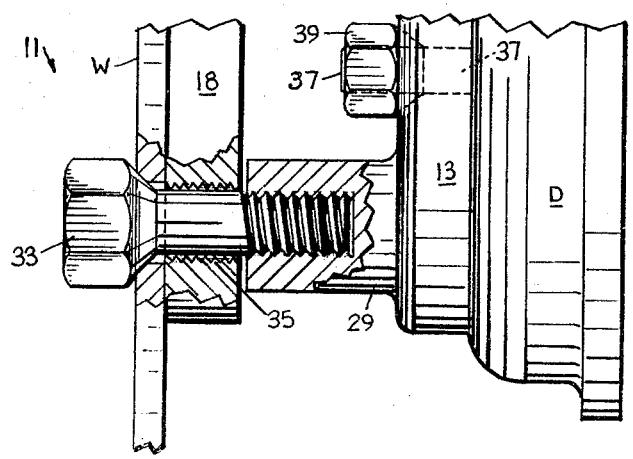
FIG. 4 is a view similar to FIG. 3, but showing the lower third of FIG. 2, with parts assembled.

An important added feature of the disclosure is the structure for providing quick and easy locking-out of the free-wheeling so that the towed vehicle can be driven when desired. This structure comprises (herein) two diametrically positioned posts 29 fixed to the outer face of the base plate 13 and terminating a few thousandths of an inch from the inner face of the member 18. The posts 29 are bored and tapped (at 31) to receive the threaded ends of long lug-screws 33, which are substituted for two removed short lug-screws 19. The long lug-screws 33 are of slightly smaller diameter than the short lug-screws 19 so that they are easily inserted through the tapped bores 21 in the member 18. The non-tapped portions of the long lug-screws 33 ride on the crests of the threads 35 (FIG. 4) of the tapped bores 21 in the member 18 and thus arrest (lock-out) relative movement between the members 13 and 18.

USE AND OPERATION

To install the disclosed device, one removes the wheel W from the lugs 37 by first removing the lug-nuts 39. The device 11 is then positioned on the lugs 37 by mating the apertures 41 in the base plate 13 with the lugs 37 and re-using the lugnuts 39 to mount the device 11 on the wheel-mounting drum D. The wheel W is then mounted on the member 18 by using the four short lug-screws 19. When it is desired to drive the towed vehicle, two of the short lug-screws 19 are removed and are replaced by two of the long lug-screws 33 extending into the posts 29 to lock-out the free-wheeling.

The invention having been described, what is claimed is:

1. A device for co-axial insertion between a vehicle wheel and its conventional wheel-mounting means, comprising: a base plate adapted for quick and easy detachable and vertically disposed and co-extensive connection to said wheel-mounting means, said base plate having spaced apertures to receive therethrough standard wheel-mounting threaded elements for attaching said device to said wheel-mounting means, a shaft rigidly and co-axially fixed to said base plate, a hub member surrounding and rotatable about said shaft, a platelike member fixed to said hub member and being roughly parallel to and co-extensive with said base plate, said plate-like member having spaced blade-like arms to define a plurality of open areas therebetween for facilitating access to said wheel-mounting elements, a plurality of elements for detachably co-acting between the conventional spaced lug apertures in the conventional disk-like central portion of a vehicle wheel for fastening said wheel to said plate-like member co-axially with said shaft.

2. A device according to claim 1 wherein said co-acting elements are lug-screws passing through standardized apertures in said wheel and into aligned tapped bores in said plate-like member.

3. A device for co-axial insertion between a vehicle wheel and its conventional wheel-mounting means, comprising: a base plate adapted for quick and easy detachable and vertically disposed and co-extensive connection to said wheel-mounting means, a shaft rigidly and co-axially fixed to said base plate, a hub member surrounding and rotatable about said shaft, a plate-like member fixed to said hub member and being roughly parallel to and co-extensive with said base plate, a plurality of elements for detachably co-acting between the conventional spaced lug apertures in the conventional disk-like central portion of a vehicle wheel for fastening said wheel to said plate-like member co-axially with said shaft, and at least one post fixed to said base plate and having a tapped bore therein aligned to receive a threaded anchoring screw passing through an aperture in said plate-like member to arrest relative movement between said base plate and said plate-like member to lock-out free-wheeling operation.

4. A device according to claim 3 wherein said last-mentioned aperture is one of said aligned tapped bores in said plate-like member and wherein said anchoring screw has a diameter slightly smaller than that of said lug-screws to facilitate its insertion through said plate-like member and into the bore of said post.

5. A device according to claim 3 wherein said plate-like member has at least one open area therein to facilitate access to said wheel-mounting elements.

6. A device according to claim 4 wherein said anchoring screw has a non-threaded shank portion adapted to conform to the crests of the threads of the threaded aperture in which it replaces a removed lug-screw.

* * * * *